US006900817B2

United States Patent
Uesugi

(10) Patent No.: US 6,900,817 B2
(45) Date of Patent: May 31, 2005

(54) MAP IMAGE PROCESSING APPARATUS AND METHOD FOR FORMING BIRDS-EYE VIEW FROM TWO-DIMENSIONAL MAP IMAGE

(75) Inventor: Hiroshi Uesugi, Nagoya (JP)

(73) Assignee: Denso Corporation, Kariya (JP)

( * ) Notice: Subject to any disclaimer, the term of this patent is extended or adjusted under 35 U.S.C. 154(b) by 206 days.

(21) Appl. No.: 10/206,230

(22) Filed: Jul. 29, 2002

(65) Prior Publication Data

US 2003/0044081 A1 Mar. 6, 2003

(30) Foreign Application Priority Data

Aug. 29, 2001 (JP) .......................................... 2001-259663

(51) Int. Cl.⁷ ................................................ G09G 5/00
(52) U.S. Cl. ...................................... 345/619; 345/684
(58) Field of Search .............................. 345/619, 684, 345/427

(56) References Cited

U.S. PATENT DOCUMENTS 5,964,810 A   10/1999  Hirano et al. ................. 701/28
6,169,552 B1 * 1/2001  Endo et al. ................. 345/427
6,346,942 B1 * 2/2002  Endo et al. ................. 345/427

FOREIGN PATENT DOCUMENTS

| JP | A-8-160852 | 6/1996 |
| JP | A-10-222059 | 8/1998 |
| JP | A-2001-343243 | 12/2001 |

* cited by examiner

Primary Examiner—Jeffery Brier
Assistant Examiner—Motilewa Good-Johnson
(74) Attorney, Agent, or Firm—Posz Law Group, PLC

(57) ABSTRACT

A map image processing method and apparatus produces a birds-eye view in real time from a two-dimensional map image. In this method and apparatus, a map image having a wider area than a display area displayed on the display device is drawn and stored. When a scroll display is instructed, a part of the two-dimensional map image is sequentially read, and a display processing operation is sequentially executed. A birds-eye view is obtained by processing the two-dimensional map image. A display processing operation is applied to the birds-eye view. Since the birds-eye view is formed by simply processing the two-dimensional map image, the birds-eye view image can be produced in high speeds and can be scrolled in a smooth display mode.

15 Claims, 11 Drawing Sheets

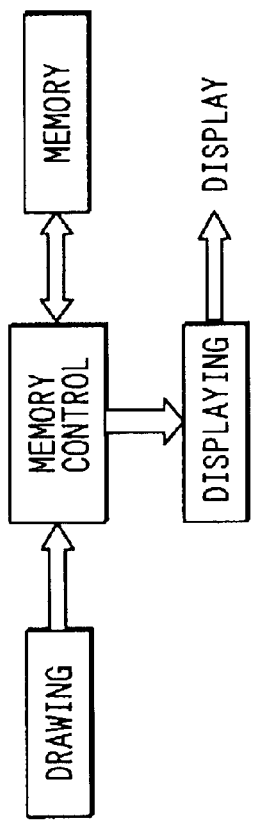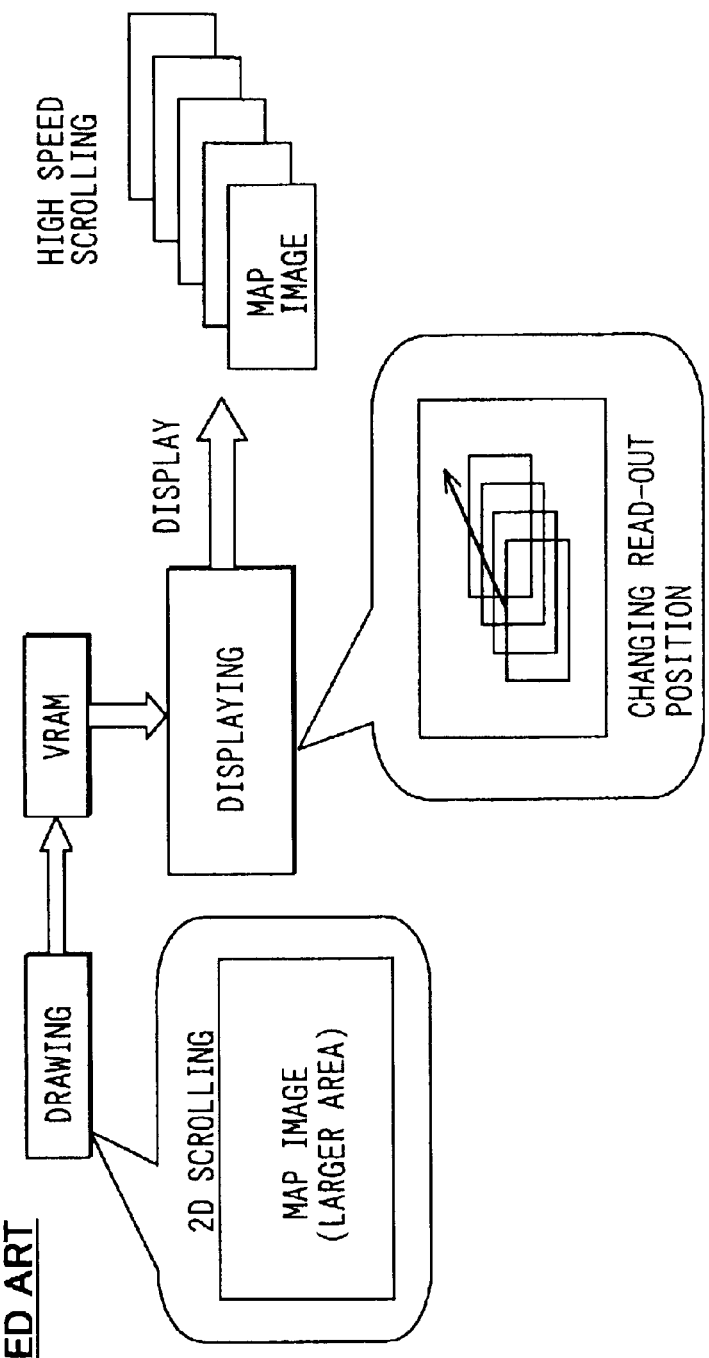
FIG. 11A
RELATED ART
FIG. 11B
RELATED ART

MAP IMAGE PROCESSING APPARATUS AND METHOD FOR FORMING BIRDS-EYE VIEW FROM TWO-DIMENSIONAL MAP IMAGE

CROSS REFERENCE TO RELATED APPLICATION

This application is based on and incorporates herein by reference Japanese Patent Application No. 2001-259663 filed on Aug. 29, 2001.

FIELD OF THE INVENTION

The present invention generally relates to a map image processing apparatus and method for executing a processing operation capable of drawing a map image and displaying the map image on a display device. The present invention also relates to a program capable of executing a map image processing operation by a computer. More specifically, the present invention relates to displaying a birds-eye view image.

BACKGROUND OF THE INVENTION

Car navigation systems are mounted on, for example, automobiles, and automatically display maps around present positions detected by using the GPS system and the like, and/or guide routes up to preset destination locations. In such car navigation systems, the areas around the present positions and the routes up to the destination locations are required to be displayed as maps. To this end, various sorts of map display apparatuses are proposed. Generally, these map display apparatuses have scroll functions of map images. Here, "scroll", means that a screen display is moved along upper/lower/right/left directions so as to display a location which is to be viewed. As to this "scroll" operation, two scroll operations are proposed, that is, a two-dimensional map scroll operation capable of scrolling the normal two-dimensional map image, and also, a birds-eye view scroll operation capable of scrolling a birds-eye view of a map.

Generally, a drawing processing operation of a map is very complicated. Also, when a map is drawn, an access operation to a memory is carried out at random. As a result, a high speed access method (burst mode) to a DRAM cannot be applied. For this reason, a display image can be hardly drawn in real time (for instance, 30 to 60 fps). This is explained in more detail with reference to FIGS. 11A, 11B, 12, 13A and 13B.

First, a processing flow operation executed in the normal display mode will be explained with reference to FIG. 11A. A map image is drawn by a drawing processing block. The drawn image data is stored in a memory by a memory control block. When an image is displayed, the image data is read out from the predetermined storage location in the memory by the memory control block. Then, such a processing operation as an RGB conversion and a simple image synthesizing operation is carried out with respect to the read image data by a display processing block. Thereafter, the processed image data is outputted to a display device at necessary timing.

Next, a high speed producing method of a display image while a two-dimensional map is scrolled is described with reference to FIG. 11B. When the two-dimensional map is scrolled, the drawing processing block draws in advance a map image having a larger area than the display area, and then stores this drawn map image in the memory. When the map image is displayed, the memory control block reads out a display area of an image in the memory. At this time, an image having a larger area than a display area has been stored in the memory. As a result, a scroll image is formed in a high speed by merely changing a read out position of the display area from the memory. In this method, the display image can be formed in real time (30 to 60 fps), and can be scrolled in a smooth manner.

In contrast to the above two-dimensional map scroll operation, in the birds-eye view scroll operation shown in FIG. 12, since display images are independently produced for every frame, such a method of the two-dimensional map scroll cannot be applied. The display images must be drawn every frame.

Here, it is assumed that a road having a constant width is drawn as a birds-eye view. In the case that a view point is moved from a point "A" to another point "B" as shown in FIG. 13A, as to both a birds-eye view formed at the point "A" and another birds-eye view formed at the point "B", roads having the same size must be drawn thereon. However, in a case that the two-dimensional map scrolling method is employed, as shown in FIG. 13B, a birds-eye view larger than a display area is drawn by the drawing processing block, and a read out position of this drawn birds-eye view image is changed. The road size at the point "B" becomes smaller than the road size at the point "A" on the birds-eye view at the point "A" and the birds-eye view at the point "B". This is not proper. As a result, the birds-eye views should be drawn every frame.

In practice, the time duration of 200 to 300 milliseconds (msec) is required in order to form one frame of a map image. Under such a display speed of 3 to 5 fps (200 msec to 300 msec/frame), movement appears unnatural, and the birds-eye views cannot be scrolled in a smooth display manner.

Thus, since the birds-eye view is produced by executing the drawing processing operation in the above manner, in particular, the images cannot be produced in real time while the birds-eye view is scrolled.

SUMMARY OF THE INVENTION

It is therefore an object of the present invention to provide an apparatus and method capable of producing a birds-eye view in real time.

According to the present invention, a two-dimensional map image is drawn and stored. This map image has a wider area than a display area of a display device and used to obtain a birds-eye view. The birds-eye view is formed by deforming the two-dimensional map image and cutting out a part of the deformed map image to be displayed on the display device.

BRIEF DESCRIPTION OF THE DRAWINGS

For a better understanding of the present invention, reference is made of a detailed description to be read in conjunction with the accompanying drawings, in which:

FIGS. 11A and 11B are schematic diagrams showing a map image processing apparatus and a two-dimensional scrolling operation according to a related art;

DETAILED DESCRIPTION OF THE PREFERRED EMBODIMENT

[FIRST EMBODIMENT]

referring first to FIG. 1 showing the first embodiment, a map image processing apparatus forms a part of an on-vehicle navigation system and executes such a control operation as drawing images used for a navigation operation and displaying these images on a display device (not shown) based upon both data and instructions acquired from a navigation control unit (not shown). To this navigation control unit, a position detector, a map data input device, an operation switch group, a speaker, an external memory, and a remote controller sensor are connected, although not shown.

Among these devices, the map data input device corresponds to such an apparatus used to input various sorts of data which contain "map matching-purpose data" capable of improving precision of position detecting operation, map data, and target data. As a storage medium, in general, a CD-ROM and a DVD are used in view of quantity of these data. Alternatively, for instance, other media such as a memory card may be employed so as to store therein these data. The map image processing apparatus may display both map data entered from the map data input device and "data other than map" such as a switch and a warning message, which are displayed on the map in such a manner that the map data is superimposed with this "data other than map." It should also be noted that as the display device, for instance, a liquid crystal display, a plasma display, a CRT, an organic EL, and the like may be positively employed.

Figure 1A:
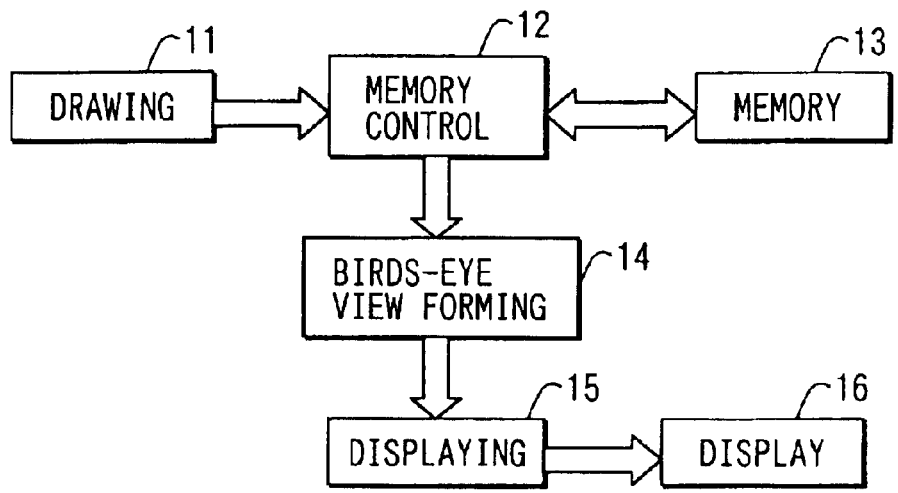
FIGS. 1A and 1B are block diagrams showing a map image processing apparatus according to the first embodiment of the present invention.

As shown in FIG. 1A, the map image processing apparatus is provided with a drawing processing block 11, a memory control block 12, a memory 13, a bird'-eye view forming block 14, a displaying processing block 15 and a display device 16.

The drawing processing block 11 draws image in response to a command entered from the navigation control unit (not shown). The memory control block 12 stores the data of this image (image data) in the memory 13. The memory 13 is constituted by a VRAM (video random access memory) and the like. Also, in the case that image data stored in this memory 13 is displayed as a birds-eye view, such an image data required to be displayed is read out from the memory 13 by the memory control block 12. Then, this image data is supplied to the birds-eye view forming block 14. In this birds-eye view forming block 14, a deformation processing operation is carried out with respect to the image data so as to form a birds-eye view. As to the birds-eye view formed in the above manner, various processing operations such as RGB converting processing and image synthesizing processing, if necessary, are performed. Thereafter, the processed birds-eye view is outputted at proper timing to the display device 16 so as to be displayed thereon in the display processing block 15.

Figure 2:
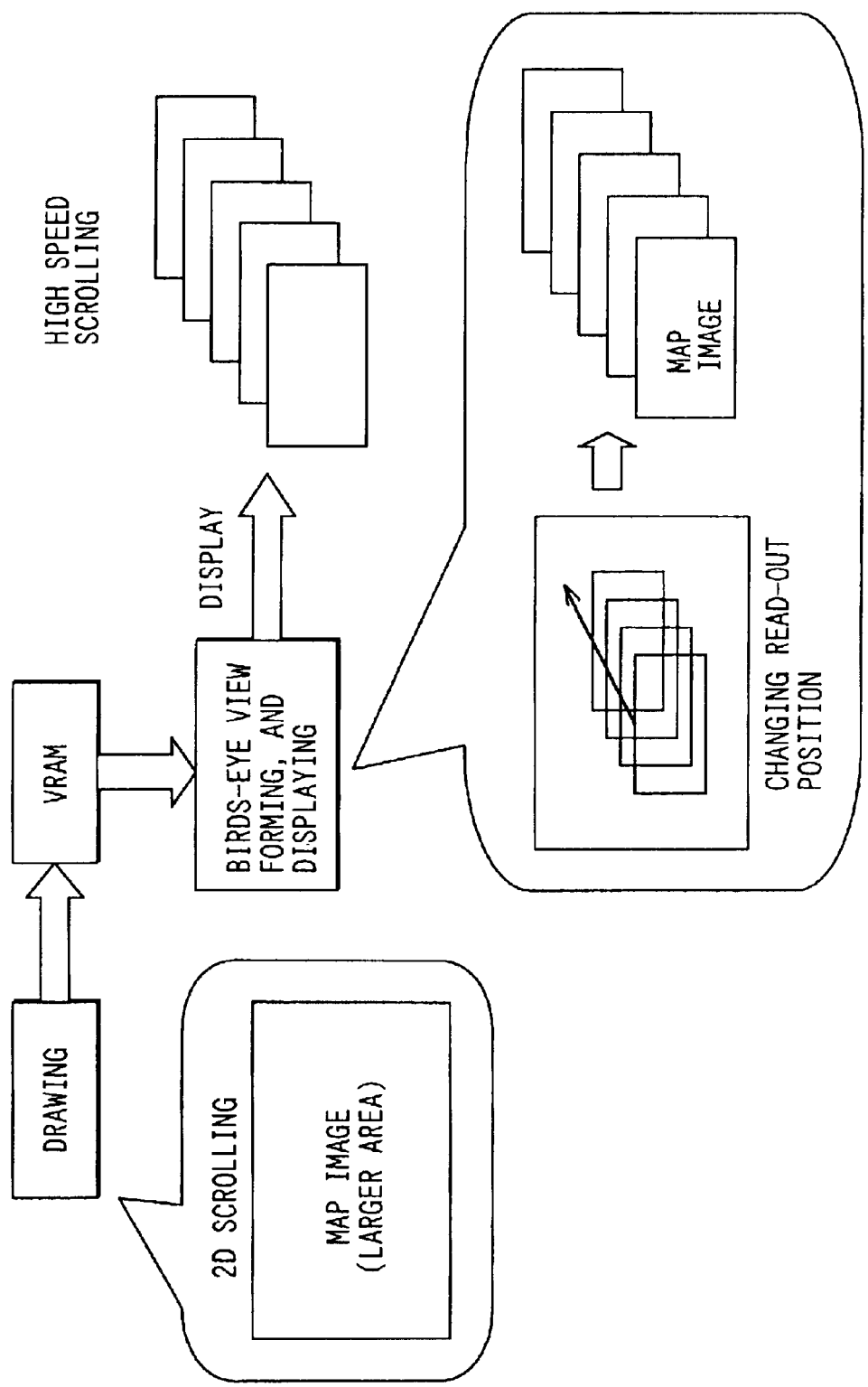
FIG. 2 is a schematic diagram showing a high speed scrolling operation of a birds-eye view in the map image processing apparatus according to the first embodiment.

In the drawing processing block 11, such an area larger than a display area is drawn in a similar manner when a two-dimensional map is scrolled. This drawn area data is stored into the memory 13 under control of the memory control block 12 (FIG. 2). Then, in the case that a birds-eye view is formed, the image data required for displaying this birds-eye view is read out from the memory 13. In the birds-eye view forming block 14, the deformation processing operation is carried out with respect to this image data read out from the memory 13 so as to form the birds-eye view.

Figure 1B:
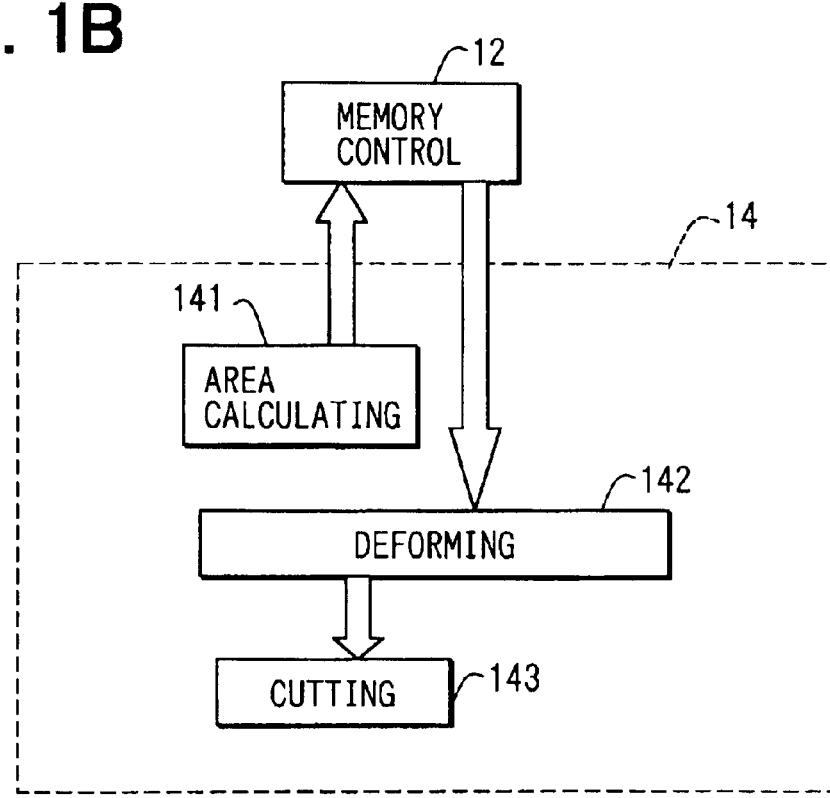

As shown in FIG. 1B, the birds-eye view forming block 14 is equipped with a read-out area calculating unit 141, a deformation processing unit 142 and a display area cutting unit 143. A deformation processing sequential operation in the case that a birds-eye view is formed will now be explained with reference to FIGS. 3A to 3C.

First, an area required to form a birds-eye view image is read out from the memory 13. Since a thinning processing operation is employed in the deformation processing operation, a deformed image becomes small. As a consequence, a relatively large area is read out from the memory 13. While the read-out area calculating unit 141 calculates to decide which area should be read out, the memory control block 12 reads out image data as to this calculated area from the memory 13, and then supplies this read imaged at a to the deformation processing unit 142. The deformation processing unit 142 executes such deformation processing operations shown in FIGS. 3A to 3C.

Figure 3A:
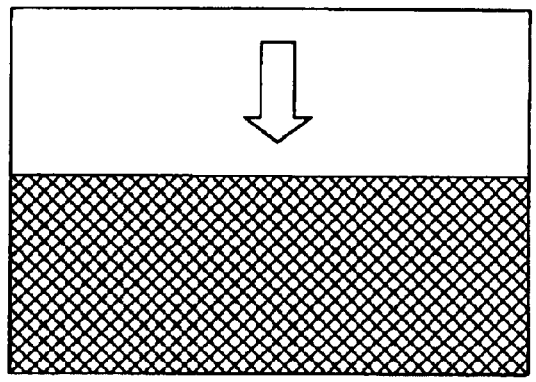
FIGS. 3A to 3C are schematic diagrams showing a deformation processing operation executed in a deformation processing unit employed in the map image processing apparatus of the first embodiment.

In the first deformation processing operation shown in FIG. 3A, the read-out image is compressed in the longitudinal direction by executing a thinning processing operation. In this case, the following thinning methods may be conceived. That is, for instance, the read-out image may be thinned in a uniform manner. Alternatively, a thinning ratio of an upper portion of the read-out image may be increased, whereas a thinning ratio of a lower portion of the read image may be decreased.

Figure 3B:
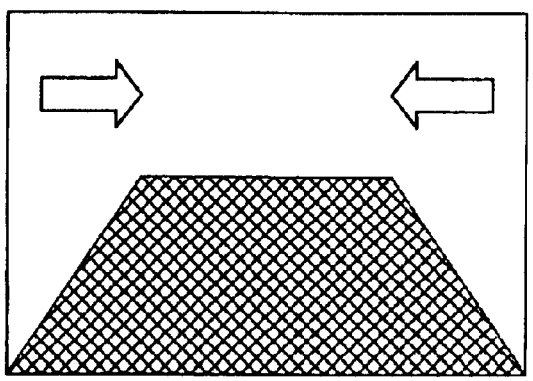

In the second deformation processing operation shown in FIG. 3B, with respect to such an image which has been compressed in the longitudinal direction, a thinning ratio from a lower portion of the image to an upper portion of this image may be increased, so that a trapezoid-shaped image may be formed.

Figure 3C:
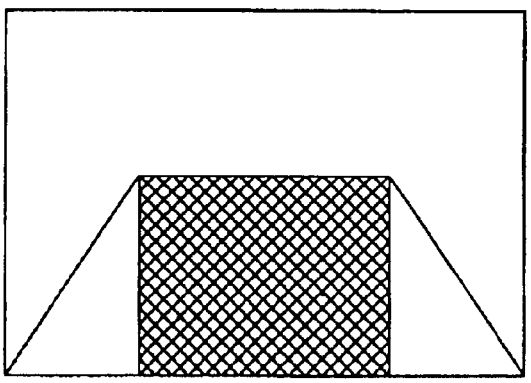

In the third deformation processing operation shown in FIG. 3C, an area having a predetermined shape (rectangular shape in this case) corresponding to a shape of a display screen may be cut off (cut out) from the trapezoid-shaped image.

As described above, the birds-eye view may be formed by executing the simple image processing manner. For an easy understanding, in the above explanations, the various processing operations have been carried out in the unit of screen, that is, the area reading operation, area compression operation in the longitudinal direction, deforming for producing the trapezoid-shaped image, and cutting operation of the display area have been carried out in the unit of screen. However, when the above processing operations are carried out in the unit of the screen, a buffer memory having a relatively large storage capacity corresponding to one sheet of this screen is required inside the birds-eye view forming block 14. It should also be understood that since the image data need not be processed in the unit of such a screen but may be processed in the unit of a small block, a buffer memory having a storage capacity responding to a small block required to execute this image processing operation may be actually provided with the birds-eye view forming block 14. Also, it is so assumed that the expression "unit of small block" in this case may involve such an expression "unit of line."

As described in detail, the birds-eye view forming block 14 is employed. While the two-dimension map image is employed as the base image, the deformation processing operation is carried out with respect to this base image. As a result, the birds-eye view image can be produced in a high speed. As explained with reference to FIGS. 11A to 13B, the birds-eye view is drawn in the drawing processing unit in the same method. However, since the complex processing operation is required in the drawing processing operation, and also, the access operations to the memory are performed at random, the drawing speed is largely lowered.

To the contrary, in accordance with this first embodiment, the birds-eye view is not newly drawn, but the birds-eye view may be produced in a simple manner by processing the two-dimensional image stored in the memory 13. As a result, even when the birds-eye view is displayed in the scrolling manner, the similar method to that executed in the case that the two-dimensional map image is displayed in the scrolling manner may be employed. That is, such a scrolling method may be employed in which the display image is produced by changing the read out position of the two-dimensional map image from the memory 13 into which this two-dimensional map image has been stored even when the birds-eye view is scroll-displayed. As a result, the birds-eye view image to be displayed may be produced in high speeds, and may be displayed in the smooth scrolling manner.

[SECOND EMBODIMENT]

Figure 4:
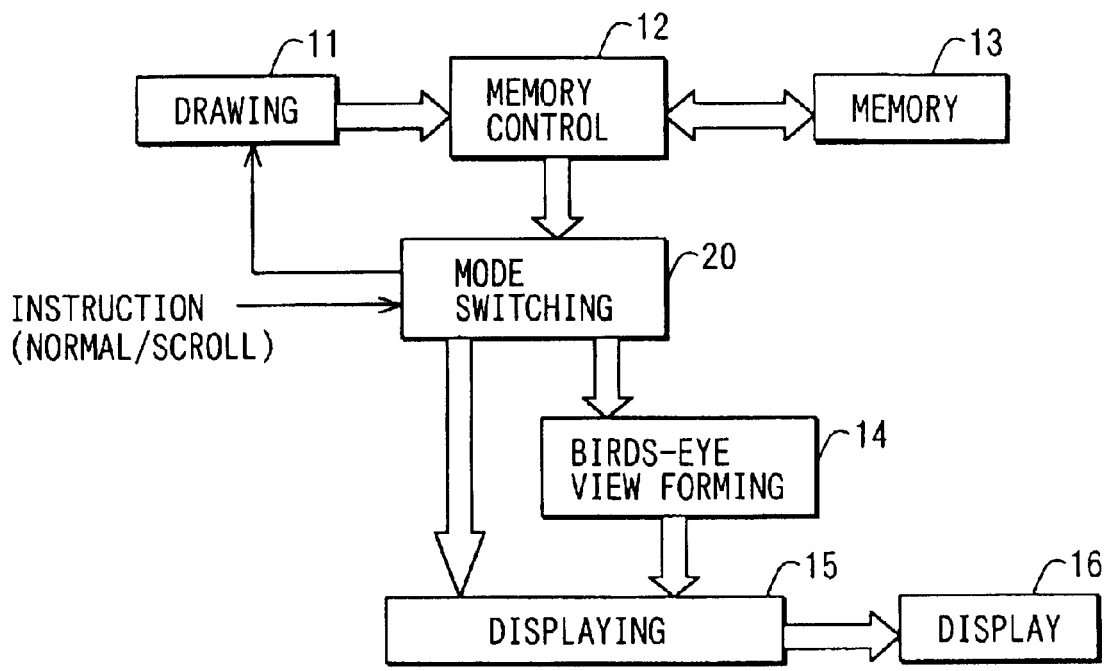
FIG. 4 is a block diagram showing a map image processing apparatus according to the second embodiment of the present invention.

In the second embodiment shown in FIG. 4, the map image processing apparatus is additionally provided with a mode switching block 20 with respect to the arrangement of the first embodiment.

In response to an instruction signal supplied from the navigation control unit (not shown), the mode switching block 20 determines whether a normal map display mode or a scroll display mode is executed when a birds-eye view is displayed, and then, executes the following control operations in correspondence with the normal mode and the scroll mode, respectively.

First, in the normal mode in which the birds-eye view is displayed without scrolling, the mode switching block 20 controls the drawing processing block 11 to draw a birds-eye view. The image data of the drawn birds-eye view is stored in the memory 13. Then, the mode switching block 20 reads out the image data of the birds-eye view stored in the memory 13 by using the memory control block 12, and then, outputs this image data of the birds-eye view to the display processing block 15.

On the other hand, in the scroll mode, the mode switching block 20 controls the drawing processing block 15 to draw a two-dimensional map image. The image data of the drawn two-dimensional map is stored in the memory 13. Then, the mode switching block 20 reads out the two-dimensional map image data stored in the memory 13 by using the memory control block 12, and then, outputs this two-dimensional map image data to the birds-eye view forming block 14. As explained in the first embodiment, in the birds-eye view forming block 14, the two-dimensional map image is deformation-processed so as to form a birds-eye view.

Generally, in the case that a birds-eye view is drawn in the image drawing processing operation, since a coordinate calculation is carried out in a correct manner, an image having a high image quality can be produced. On the other hand, since a "quasi-birds-eye view" is formed by executing the simple deformation processing operation in the birds-eye view forming block 14 of this second embodiment, the image quality of the birds-eye view is relatively low in comparison with that obtained when the birds-eye view is drawn. However, when the birds-eye view is scrolled, movement of the screen is fast, so that detailed portions of this scrolled birds-eye view cannot be visibly viewed. When such a human visual characteristic is considered, even if such a birds-eye view having a similar image quality to that obtained when the birds-eye view is drawn is not employed in the scrolling operation, no specific problem may occur.

Therefore, in this second embodiment, the processing operation is carried out in the normal mode in such a way that the birds-eye view having the high image quality is formed to be displayed by executing the drawing processing operation, whereas the processing operation is carried out in the scroll mode in such a manner that the birds-eye view is formed in the simple manner by executing the image manipulation. As a consequence, the processing operation for producing the birds-eye view in the high speed is executed.

It should be understood that if the above technical idea is employed, then the following modifications may be employed. That is, in the case that a scroll display of a birds-eye view is instructed, such a display is performed with employment of the birds-eye view formed in the birds-eye view forming block 14 only when a scroll speed is a high speed scroll display, whereas when the scroll speed is slow, the birds-eye view drawn in the drawing processing block 1 is displayed. Although the difference is whether the scroll operation is employed, in the case that the scroll speed is slow, it is likely that the deterioration of the image of the birds-eye view formed in the bird,-eye view forming block 14 may become conspicuous.

As a consequence, even when the birds-eye view formed in the birds-eye view forming block 14 is displayed, the above method for forming the birds-eye view is switched, while such a scrolling case is assumed us the high speed scroll higher than the scroll speed at which the image deterioration does not become conspicuous if the image observation is made based upon the visual characteristic of the user who observe this birds-eye view. In this case, the mode switching block 20 shown in FIG. 4 may enter a scroll speed from the navigation control unit in order to determine whether or not the high speed scroll operation is carried out. Alternatively, the navigation control unit may determine as to whether or not the high speed scroll operation is carried out, and this determination result may be entered into the mode switching block 20.

[THIRD EMBODIMENT]

In a birds-eye view image, in order to represent a perspective feeling, it is preferred to display a far-away part in the image in a misty scene. To this end, in this third embodiment, an α blending processing operation may be carried out in either the birds-eye view forming block 14 or the display processing block 15 employed in the arrangement of either the first embodiment or the second embodiment.

This α blending processing operation implies that when two sets of images are synthesized with each other, a calculation is carried out by employing an α value indicative of transmittance. A formula of the α blending processing operation is given as follows:

$$Pdisp = (1-\alpha) \times Pa + \alpha \times Pb,$$

where symbol "Pdisp" indicates a pixel value to be displayed, symbol "Pa" shows a pixel value of a plane "a", symbol "Pb" denotes a pixel value of another plane "b", and symbol "α" indicates a ratio of transmittance when two sets of images are synthesized with each other.

Figure 5A:
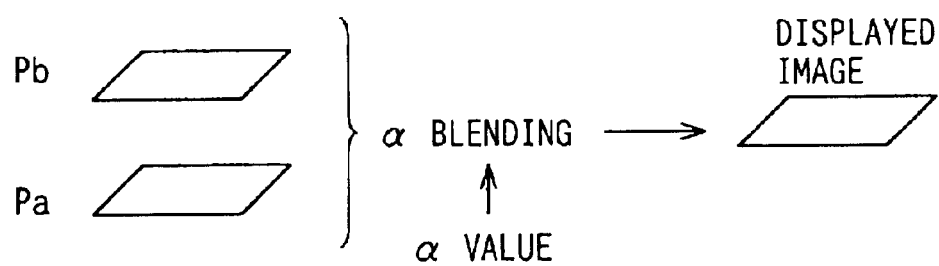
FIGS. 5A and 5B are schematic diagrams showing α blending operation in the third embodiment of the present invention.
Figure 5B:
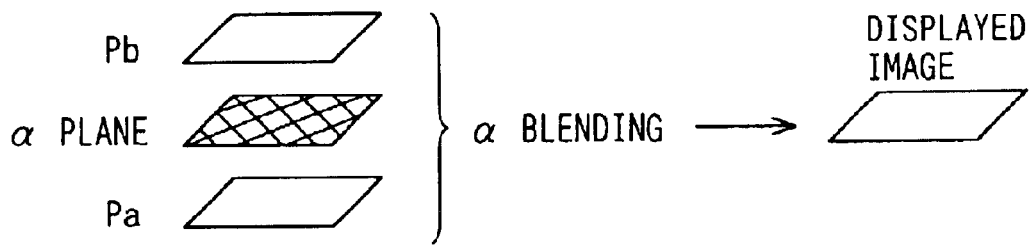
Figure 6:
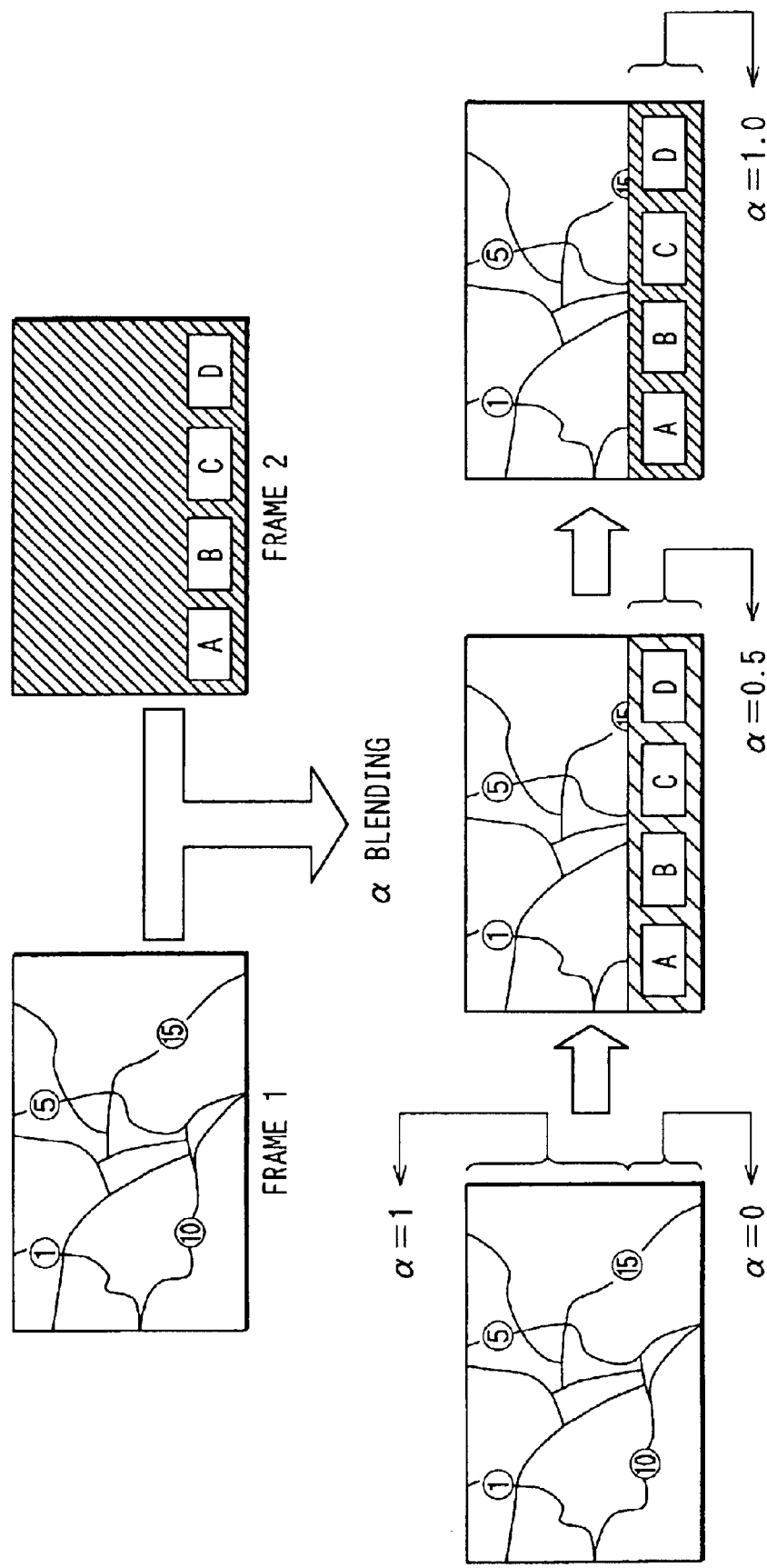
FIG. 6 is a schematic diagram showing an image synthesizing example by the α blending operation.

It is assumed that the plane "b" is a plane of an upper side as shown in FIGS. 5A and 5B. In the case of α=1, the plane (plane "b") of the upper side is displayed, whereas in the case of α=0, a plane (plane "a") of a lower side is displayed. One example of a synthesized screen in the case that the α value is changed into 0, 0.5, and 1.0 is shown in FIG. 6.

With respect to this α value, while a preselected value may be entered from the navigation control unit (FIG. 5A), or an α plane where a predetermined α value has been previously constituted in the unit of a screen is prepared, the α blending processing operation may be carried out by employing this prepared value (FIG. 5B).

Thus, in order that the mist scene appears as long as the viewer goes, such a gradation image "Pb" is synthesized in which a map image can be clearly viewed in a lower portion of the screen, and a map image in the vicinity of the horizon within the birds-eye view appears blurred. This gradation image is prepared in advance in the memory 13. Alternatively, a mechanism capable of producing a gradation image in a simple manner may be provided. This mechanism capable of producing the gradation image is provided as a step subsequent to the display area cutting unit 143 in FIG. 1B. That is, the gradation processing operation is carried out with respect to such an image which is cut out by the display area cutting unit 143.

Also, another technical idea may be employed. That is, while a monochromatic image (single-colored image) is prepared, this monochromatic image is synthesized with a birds-eye view image by executing the α blending processing operation. In this case, an α value of a lower portion on a screen is decreased (that is, ratio of layer of map image is increased), whereas another α value of a boundary area between the sky and the horizon in the birds-eye view is increased (ratio of layer of map image is decreased). Alternatively, as apparent from the foregoing description, the α plane may be prepared in advance by employing the method shown in FIG. 5B in order to obtain the distribution of the above α values.

[FOURTH EMBODIMENT]

Figure 7:
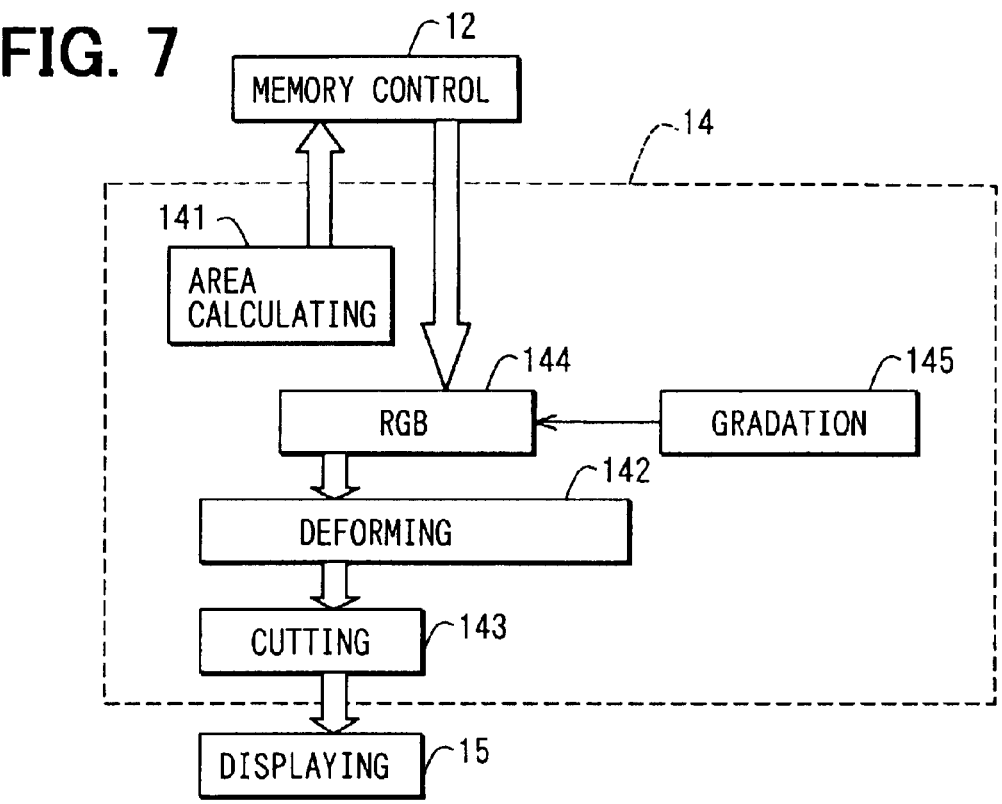
FIG. 7 is a block diagram showing a map image processing apparatus according to the fourth embodiment of the present invention.

In the fourth embodiment shown in FIG. 7, the map image processing apparatus has a function capable of producing gradation in a background color in order to represent a perspective feeling with respect to map image data expressed by a color palette method, which is known as a color mapping scheme. The map image processing apparatus is additionally provided with an RGB converting unit 144 and a gradation generating unit 145 with respect to the arrangement of the birds-eye view forming block 14 shown in FIG. 1B of the first embodiment. These RGB converting unit 144 and the gradation generating unit 145 execute such a processing operation in order to generate gradation with respect to a pixel having an address value of a background color.

In this embodiment, it is so assumed that map image data represented by way of a color palette method has been stored in the memory 13. The read-out area calculating unit 141 reads out necessary image data from the memory 13 via the memory control block 12. Then, the RGB converting unit 144 converts this read image data into RGB data. At this time, with respect to plural pixels equal to the background colors, the gradation generating unit 145 determines values of the respective pixels corresponding to the background colors in such a manner that the background colors may become gradation over the entire screen. The values of these pixels are determined as follows. That is, while such a background color of a lower portion (front side of map) of the screen is used as a reference color, an RGB value is added to the background color functioning as the reference color in response to a ratio of Y coordinate (longitudinal direction of screen) of a pixel corresponding to the read background color. Alternatively, while a coordinate value along the Y direction is employed as a parameter of weighting operation, the reference background color may be multiplied by this weighting parameter.

Figure 8:
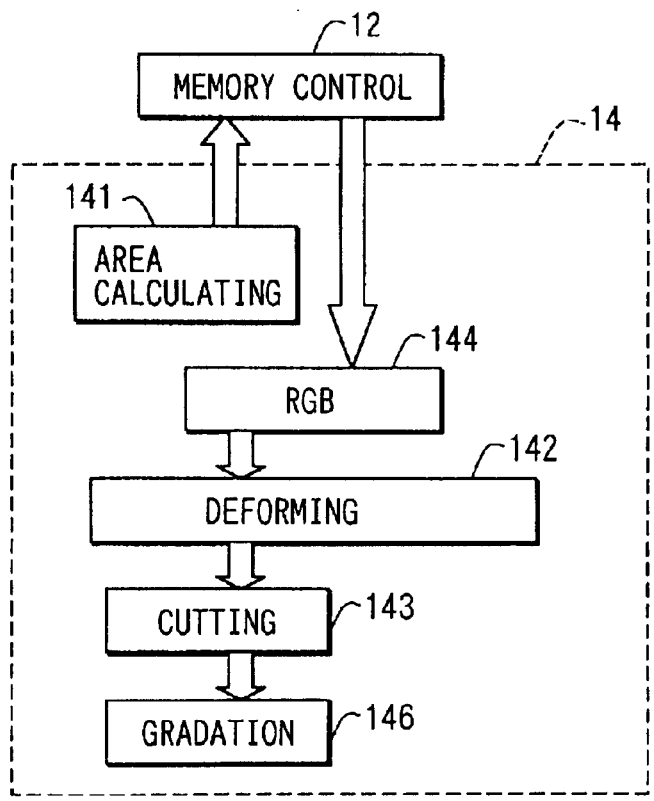
FIG. 8 is a block diagram showing a map image processing apparatus according to a modification of the fourth embodiment.

In the case of the arrangement shown in FIG. 7, the gradation is generated before the deformation processing operation is carried out by the deformation processing unit 142. As shown in FIG. 8, the gradation may be alternatively generated by the gradation generating unit 146 with respect to such an image which has been deformation-processed by the deformation processing unit 142.

[FIFTH EMBODIMENT]

When a two-dimensional map image is directly processed by way of the birds-eye view deforming processing operation in the birds-eye view forming block 14, not only the map image but also characters would be deformed. Deformation of these characters especially becomes conspicuous as deterioration occurs in image qualities. Therefore, the map image processing apparatus according to the fifth embodiment employs such an arrangement capable of avoiding that the deformations of the characters become conspicuous.

Figure 9:
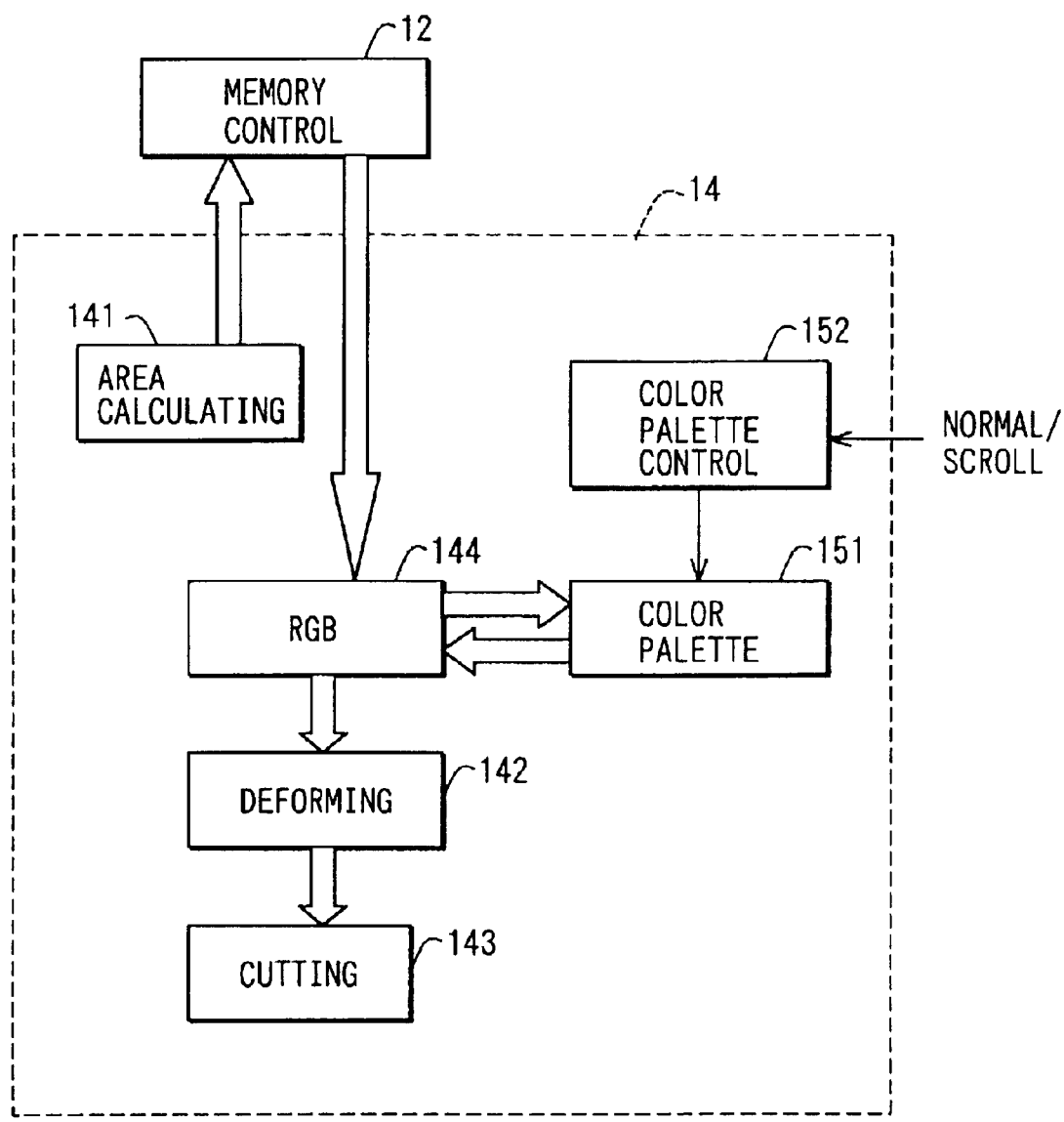
FIG. 9 is a block diagram showing a part of a map image processing apparatus according to the fifth embodiment of the present invention.

As shown in FIG. 9, the map image processing apparatus is additionally provided with the RGB converting unit 144, a color palette 151, and a color palette control unit 152 with respect to the arrangement of the birds-eye view forming block 14 employed in the first embodiment shown in FIG. 1B. A color of a portion corresponding to character data is converted by these RGB converting unit 144, color palette 151 and the color palette control unit 152.

In this embodiment, it is so assumed that map image data represented by way of a color palette method has been stored in the memory 13 (FIG. 1A). The read-out area calculating unit 141 reads out necessary image data from the memory 13 via the memory control block 12. Then, the RGB converting unit 144 converts this read image data into RGB data. At this time, the color palette control unit 152 which could grasp that the present operation mode becomes the scroll mode based upon the mode signal controls the color palette 151 in such manner that the pixel corresponding to the character data is set to an intermediate value between the color of the character data and the background color. As a result, the color of the character may become similar to the color of this background, so that the deformed character cannot become conspicuous within the formed birds-eye view.

[SIXTH EMBODIMENT]

Figure 10:
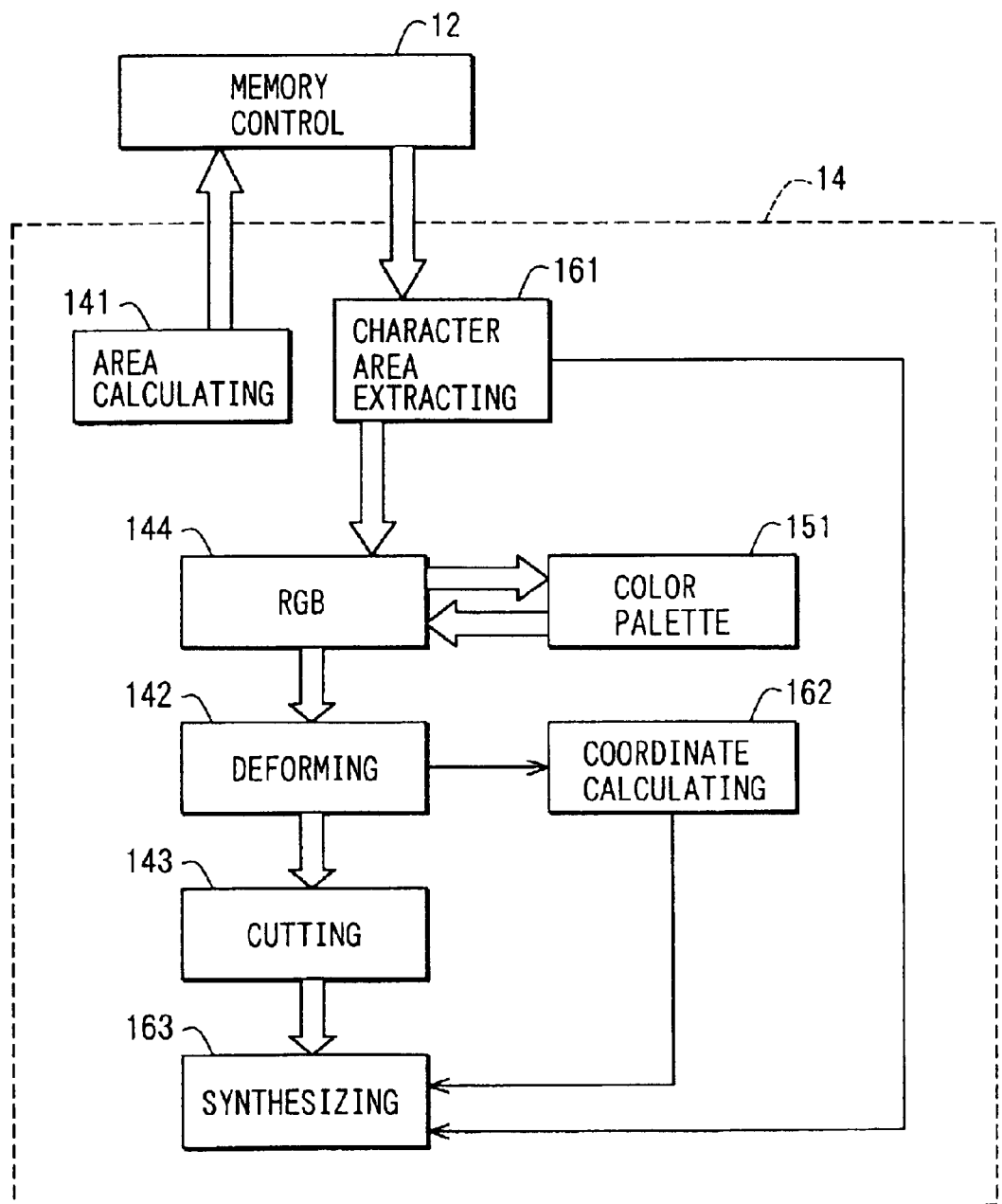
FIG. 10 is a block diagram showing a part of a map image processing apparatus according to the sixth embodiment.
Figure 12:
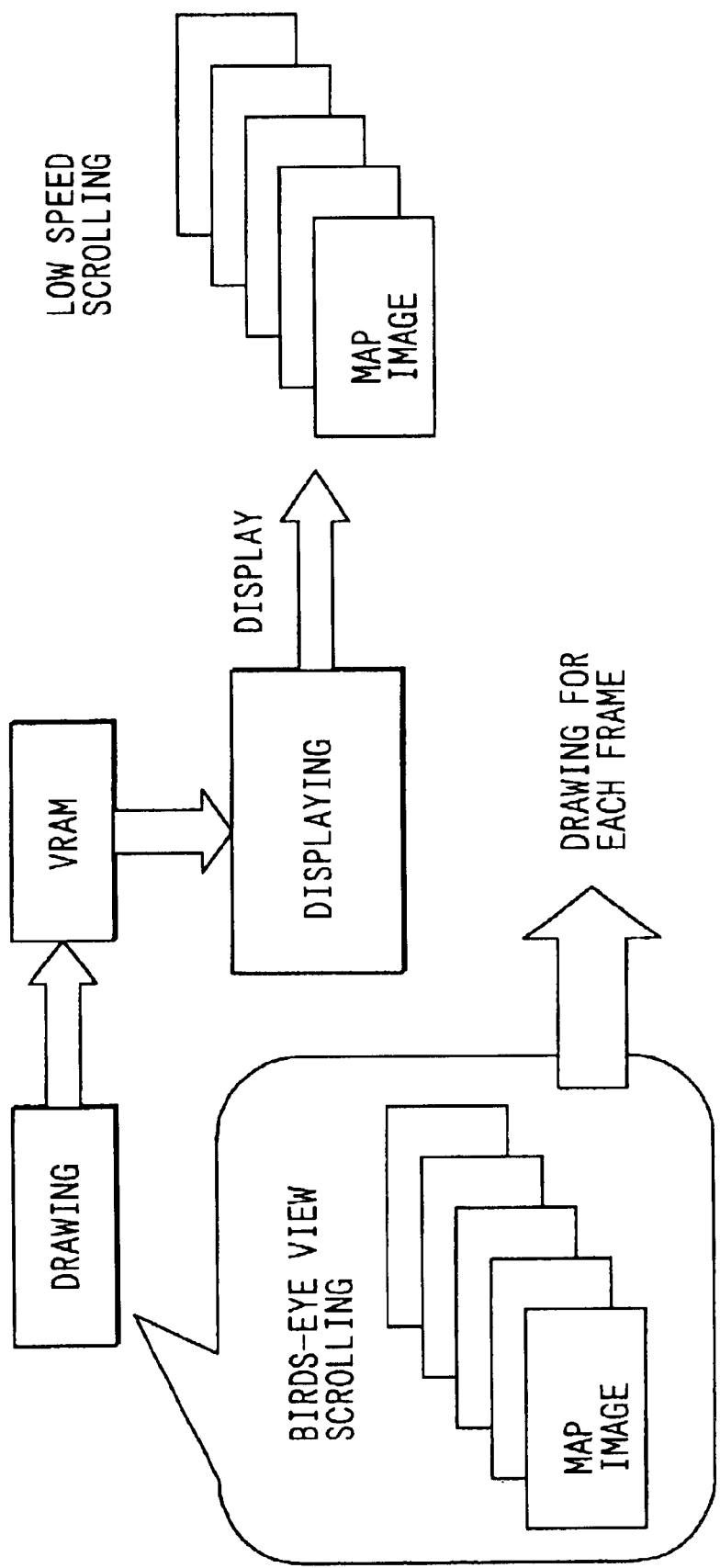
FIG. 12 is a schematic diagram showing operation of a birds-eye view scrolling operation in a related art.
Figures 13A, 13B:
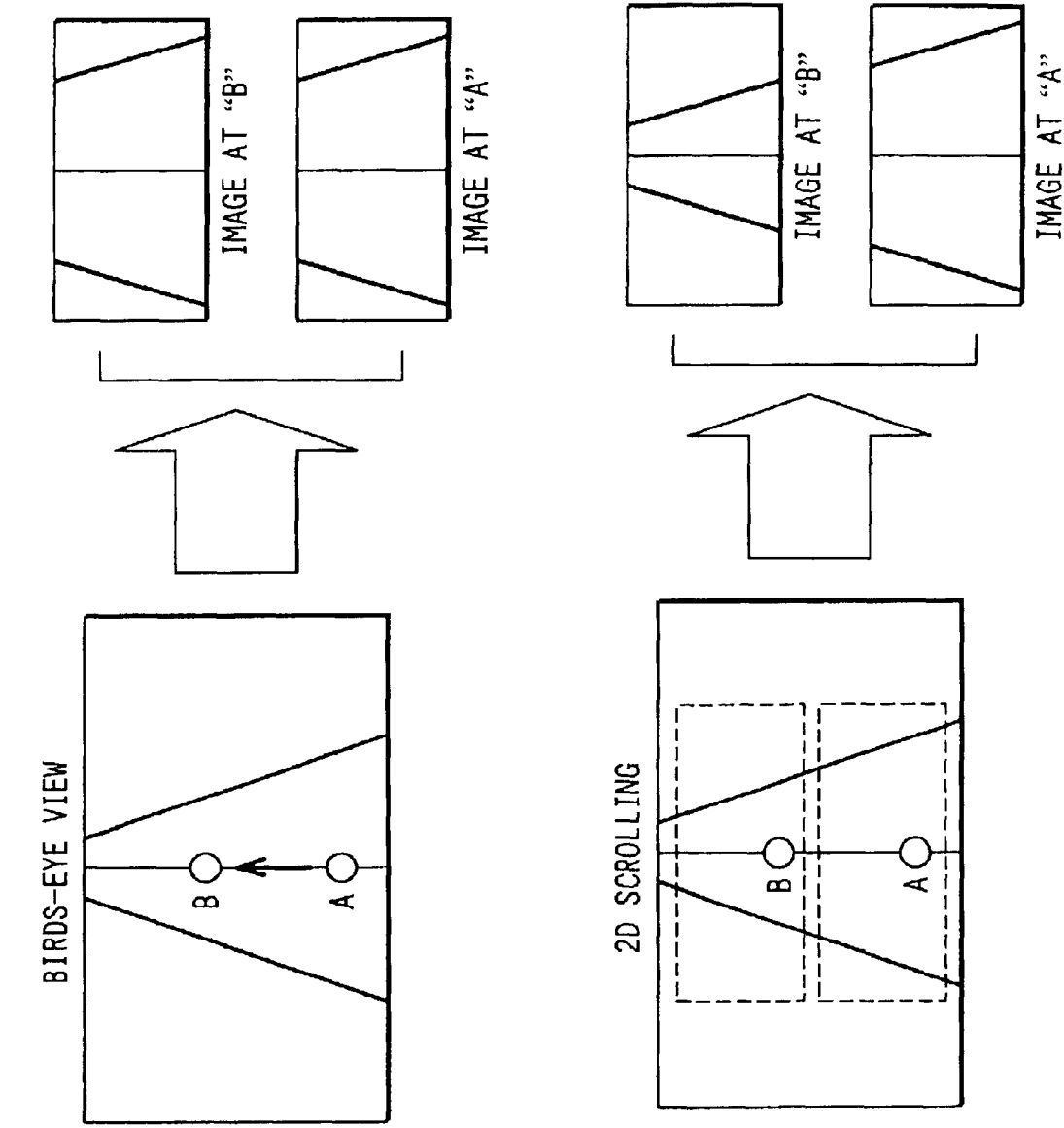
FIGS. 13A and 13B are schematic diagrams showing the two-dimensional scrolling operation and the birds-eye view scrolling operation in the related art.

In the sixth embodiment shown in FIG. 10, while the deformation of the character is employed as the initial condition, the color of this character is changed in order that this deformation of the character does not become conspicuous. Therefore, only a map image is deformed to be formed as a birds-eye view without deforming a character. Therefore, the character is synthesized with this birds-eye view.

The map image processing apparatus of this sixth embodiment is additionally provided with the RGB converting unit 144, color palette 151, character area extracting unit 161, character arrangement coordinate calculating unit 162, and character data synthesizing unit 163 with respect to the arrangement of the birds-eye view forming block 14 employed in the first embodiment shown in FIG. 1B.

The read-out area calculating unit 141 reads out image data of an area which is deformation-processed via the memory control block 12 from the memory 13 (FIG. 1A). Then, the character area extracting unit 161 extracts a character area from the read image data. Thereafter, a color of a pixel corresponding to the character data is converted into the same color as that of background data. Also, in this case, while map image data represented by a color palette method is employed as an initial condition, this map image data is converted into RGB data by the RGB converting unit 144. At this data conversion, the pixel corresponding to the character data is converted into a value of a background color by employing the color palette 151.

For extracting the character area, the image enlarging/compressing method which has been usually used in the image processing operation is applied. In this case, the data which are extracted correspond to both a coordinate value and a dimension of the character area, and also the character data within the character area. With respect to the image data in which the character data has been converted into the background color in this manner, the above deformation processing operation to the birds-eye view is carried out by the deformation processing unit 142.

When the deformation processing unit 142 executes the deformation processing operation, the character arrangement coordinate calculating unit 162 calculates such a coordinate that the character data on the two-dimensional map is arranged on the birds-eye view image. Then, in the character data synthesizing unit 163, while employing both the character data stored in the character area extracting unit 161 and the character arrangement coordinate value calculated by the character arrangement coordinate calculating unit 162, the character data is synthesized at a predetermined position with respect to the birds-eye view image in which the deformation processing operation has been carried out.

If the above processing operation is carried out, then the birds-eye view image can be generated without deforming the character data.

It should also be understood that in the case of the arrangement shown in FIG. 10, the two-dimensional map image stored in the memory 13 is actually checked, so that the area where the character data is present may be grasped. Alternatively, the relevant information may be acquired from an external unit. For instance, when a map image is drawn in the drawing processing block 11, if an area where a character is located can be grasped, then both the area of the character data and the information of the position may be inputted from the drawing processing block 11 into the character area extracting unit 161.

[SEVENTH EMBODIMENT]

In the case that the birds-eye view is displayed in the scroll display mode (otherwise, high speed scroll display mode), the two-dimensional map image is processed so as to form the birds-eye view by the birds-eye view forming block 14. However, the birds-eye view image which is correctly produced by drawing the birds-eye view by the drawing processing block 11 cannot be completely made coincident with the birds-eye view image which is formed by the birds-eye view forming block 14. As a result, in a case that the birds-eye view having the higher image quality is produced in the normal mode by executing the drawing processing operation, and the birds-eye view is formed in the simple manner in the scroll mode by performing the image processing operation, when the scroll mode is advanced to the normal mode, otherwise the normal mode is advanced to the scroll mode, a sense of incongruity may occur in displayed images. This is because the images are different from each other between the normal mod and the scroll mode.

In this seventh embodiment, in order to avoid the occurrence of this incongruity sense, the $\alpha$ blending operation is executed by the display processing block 15. That is, in such a case that the display mode is switched from the normal mode (drawn image is displayed) to the scroll mode (image produced by deforming processing operation is displayed), otherwise, the display mode is conversely switched from the scroll mode to the normal mode, both the images obtained before/after the display mode is changed are processed by the $\alpha$ blending processing operation in the display processing block 15. Specifically, when the birds-eye view is displayed, while one-screen data amount of bird's-eye image data which are outputted to the display device is left, if the display mode is changed, then both the birds-eye view which has been formed by executing the drawing operation (by drawing processing block 11), or by the forming operation (by birds-eye view forming block 14) after the mode change, and one-screen data amount of the birds-eye view image data outputted to the display device immediately before the above-described mode change are processed by the $\alpha$ blending processing operation so as to smooth the transition of the displayed image. As a result, it is possible to avoid the occurrence of such an incongruity sense during mode transition.

[OTHER EMBODIMENT]

(1) In the above embodiments, the birds-eye view is formed (or drawn) and displayed. Apparently, a two-dimensional map image may be displayed under normal condition, or in the scroll mode. When such a two-dimensional map image is displayed in the scroll mode, read-out positions of the stored two-dimensional map image from the memory 13 are merely changed to produce a display image.

(2) The above map image processing apparatus of these embodiments may also be applied to a navigation system which is not mounted on a vehicle. Furthermore, it may be applied to various systems other than such a navigation system.

What is claimed is:

1. A map image processing apparatus comprising:
   drawing processing means for drawing a two-dimensional map image;
   storage means for storing therein the two-dimensional map image drawn by the drawing processing means;
   storage/read-out control means for controlling storing and reading operations of the two-dimensional map image in and from the storage means, respectively; and display processing means for executing a display processing operation capable of displaying a map image on a display means based upon the two-dimensional map image which is read out from the storage means by the storage/read-out control means,
  wherein a map image having a wider area than a display area displayed on the display device is drawn by the drawing processing means, and
  wherein, when a scroll display is performed, a portion of the two-dimensional map image stored in the storage means is sequentially read, and the display processing operation by the display processing means is sequentially executed so that a scroll display processing operation is realized,
the apparatus further comprising:
  image processing means for processing the two-dimensional map image read out from the storage means by the storage/read-out control means to obtain a birds-eye view,
wherein the display processing means executes the display processing operation with respect to the birds-eye view obtained by the image processing means; and
  mode switching control means for switching a processing mode in the drawing processing means and the processing mode in the display processing means based upon whether a scroll display is instructed,
    wherein the mode switching control means executes a normal mode processing operation and a scroll mode processing operation,
    wherein, in the normal mode processing operation, when only the birds-eye view display is instructed, the drawing processing means draws the birds-eye view to be stored in the storage means, and the display processing means reads out the birds-eye view stored in the storage means to execute the display processing thereto, and
  wherein, in the scroll mode processing operation, when both the birds-eye view display and the scroll display are instructed, the drawing processing means draws a two-dimensional map image to be stored into the storage means, a portion of the two-dimensional map image stored in the storage means is sequentially read out so as to be processed to obtain the birds-eye view by the image processing means, and the display processing means sequentially displays the birds-eye view obtained by the image processing means so that the scroll display of the birds-eye view is realized.

2. The map image processing apparatus as in claim 1, wherein:
  the mode switching control means is capable of switching the processing modes based upon whether a high speed scroll display whose scroll speed is higher than a predetermined speed is instructed; and
  the mode switching control means executes the normal mode processing operation when only the birds-eye view display is instructed, and the mode switching control means executes the scroll mode processing operation when both the birds-eye view display and the high speed scroll display are instructed.

3. The map image processing apparatus as in claim 1, wherein the image processing means includes:
  a read-out area calculating unit for calculating an area within the two-dimensional image, which is required to be processed to obtain the birds-eye view;
  a deformation processing unit for reading the two-dimensional map image of the area calculated by the read-out area calculating unit and for executing a deformation processing operation with respect to the read two-dimensional map image; and
  a display area cutting unit for cutting out an area which should be displayed as a birds-eye view from the image which is deformation-processed by the deformation processing unit.

4. The map image processing apparatus as in claim 1, wherein:
  when the processing operation in the normal mode and the processing operation in the scroll mode are transferred, the display processing operation $\alpha$-blends both the birds-eye view image obtained by the processing operation before being transferred, and another birds-eye view image obtained by the processing operation after being transferred, so that the birds-eye view image obtained by the processing operation before being transferred is smoothly transferred to the birds-eye view image obtained by the processing operation after being transferred.

5. The map image processing apparatus as in claim 1, wherein the birds-eye view obtained by the image processing means is provided to the display processing means without being stored in the storage means.

6. The map image processing apparatus as in claim 1, wherein the birds-eye view obtained by the image processing means is more simplified than that drawn by the drawing processing means in the normal mode.

7. A map image processing apparatus comprising:
  drawing processing means for drawing a two-dimensional map image;
  storage means for storing therein the two-dimensional map image drawn by the drawing processing means;
  storage/read-out control means for controlling storing and reading operations of the two-dimensional map image in and from the storage means, respectively; and
  display processing means for executing a display processing operation capable of displaying a map image on a display means based upon the two-dimensional map image which is read out from the storage means by the storage/read-out control means,
    wherein a map image having a wider area than a display area displayed on the display device is drawn by the drawing processing means, and
    wherein, when a scroll display is performed, a portion of the two-dimensional map image stored in the storage means is sequentially read, and the display processing operation by the display processing means is sequentially executed so that a scroll display processing operation is realized,
  the apparatus further comprising:
    image processing means for processing the two-dimensional map image read out from the storage means by the storage/read-out control means to obtain a birds-eye view,
  wherein the display processing means executes the display processing operation with respect to the birds-eye view obtained by the image processing means, wherein:
    either the image processing means or the display processing means performs an $\alpha$ blending operation with respect to the birds-eye view obtained by the image processing means in order to represent a perspective feeling where a far-away portion of the birds-eye view is more misty than a near portion.

8. The map imaging processing apparatus as claim, 7, wherein:
either the image processing means or the display processing means has a function of synthesizing a layer image having a predetermined color on the birds-eye view image by executing the α blending operation; and
either the image processing means or the display processing means sets α values indicative of transmittance in a manner that the α value is relatively decreased in a lower portion of a display screen so as to clearly display the birds-eye view image, whereas the α value is relatively increased in an upper portion on the display screen in order that a synthesizing ratio of the predetermined color is increased.

9. The map image processing apparatus as in claim 8, wherein:
while an α plane is previously prepared in which the dimensions of the α values are relatively set in response to the upper/lower portions of the screen, the α blending operation is performed by employing data of the α plane.

10. A map image processing apparatus comprising:
drawing processing means for drawing a two-dimensional map image;
storage means for storing therein the two-dimensional map image drawn by the drawing processing means;
storage/read-out control means for controlling storing and reading operations of the two-dimensional map image in and from the storage means, respectively; and
display processing means for executing a display processing operation capable of displaying a map image on a display means based upon the two-dimensional map image which is read out from the storage means by the storage/read-out control means,
wherein a map image having a wider area than a display area displayed on the display device is drawn by the drawing processing means, and
wherein, when a scroll display is performed, a portion of the two-dimensional map image stored in the storage means is sequentially read, and the display processing operation by the display processing means is sequentially executed so that a scroll display processing operation is realized,
the apparatus further comprising:
image processing means for processing the two-dimensional map image read out from the storage means by the storage/read-out control means to obtain a birds-eye view,
wherein the display processing means executes the display processing operation with respect to the birds-eye view obtained by the image processing means, wherein:
the storage means stores therein the two-dimensional map image represented by a color palette method;
the image processing means is arranged in such a manner that the two-dimensional map image read out from the storage means is converted from color palette data into RGB data, and thereafter the RGB data is processed to obtain the birds-eye view; and
the image processing means executes a gradation processing operation before or after the RGB data is processed to obtain the birds-eye view by which such RGB data as to pixels corresponding to a background color within image data are adjusted so that colors are changed in an asymptotic manner from the lower portion of the display screen up to the upper portion thereof.

11. A map image processing apparatus comprising:
drawing processing means for drawing a two-dimensional map image;
storage means for storing therein the two-dimensional map image drawn by the drawing processing means;
storage/read-out control means for controlling storing and reading operations of the two-dimensional map image in and from the storage means, respectively; and
display processing means for executing a display processing operation capable of displaying a map image on a display means based upon the two-dimensional map image which is read out from the storage means by the storage/read-out control means,
wherein a map image having a wider area than a display area displayed on the display device is drawn by the drawing processing means, and
wherein, when a scroll display is performed, a portion of the two-dimensional map image stored in the storage means is sequentially read, and the display processing operation by the display processing means is sequentially executed so that a scroll display processing operation is realized,
the apparatus further comprising:
image processing means for processing the two-dimensional map image read out from the storage means by the storage/read-out control means to obtain a birds-eye view,
wherein the display processing means executes the display processing operation with respect to the birds-eye view obtained by the image processing means, wherein:
the image processing means approximates a color of a pixel corresponding to a character within the image data to a preselected color under which a character deformation does not become conspicuous, responsive to the scroll display of the birds-eye view being performed.

12. A map image processing apparatus comprising:
drawing processing means for drawing a two-dimensional map image;
storage means for storing therein the two-dimensional map image drawn by the drawing processing means;
storage/read-out control means for controlling storing and reading operations of the two-dimensional map image in and from the storage means, respectively; and
display processing means for executing a display processing operation capable of displaying a map image on a display means based upon the two-dimensional map image which is read out from the storage means by the storage/read-out control means,
wherein a map image having a wider area than a display area displayed on the display device is drawn by the drawing processing means, and
wherein, when a scroll display is performed, a portion of the two-dimensional map image stored in the storage means is sequentially read, and the display processing operation by the display processing means is sequentially executed so that a scroll display processing operation is realized,
the apparatus further comprising:
image processing means for processing the two-dimensional map image read out from the storage means by the storage/read-out control means to obtain a birds-eye view,
wherein the display processing means executes the display processing operation with respect to the birds-eye view obtained by the image processing means, wherein the image processing means includes:

a character area extracting unit for extracting a character area from the map image data before being processed to obtain the birds-eye view;

a character arrangement position calculating unit for calculating a position where a character should be arranged within the birds-eye view obtained by processing the map image data based on the processing content of obtaining the birds-eye view; and a character data synthesizing unit for synthesizing the data of the character area extracted by the character area extracting unit with the character arrangement position calculated by the character arrangement position calculating unit with respect to the birds-eye view which is obtained after the map image data has been processed, wherein, after the character area is extracted by the character area extracting unit, the image processing means interpolates a pixel corresponding to the character by a predetermined color, and processes the interpolated image data to obtain the birds-eye view.

13. The map image processing apparatus as in claim 12, wherein:

the character area extracting unit grasps the character area based upon the map image data.

14. The map image processing apparatus as in claim 12, wherein:

the character area extracting unit inputs therein information related to the character region obtained when the drawing processing means draws the two-dimensional map image to grasp the character area.

15. A map image processing method comprising:

drawing a two-dimensional map image;

storing the two-dimensional map image; and executing a display processing operation capable of displaying a map image based upon the two-dimensional map image, wherein a map image having a wider area than a display area is drawn, and wherein, when a scroll display is performed, a portion of the two-dimensional map image is sequentially read, and the display processing operation is sequentially executed so that a scroll display processing operation is realized, further comprising processing the two-dimensional map image to obtain the birds-eye view by calculating an area within the two-dimensional image which is required to be processed to obtain the birds-eye view, reading the two-dimensional map image of the area, executing a deformation processing operation with respect to the read two-dimensional map image, and cutting out an area which should be displayed as the birds-eye view from the image which is deformation-processed, wherein the display processing operation is executed with respect to the birds-eye view and the display of the birds-eye view is made without storing the birds-eye view after obtaining the birds-eye view from the stored two-dimensional map image.

* * * * *